US012776518B2

(12) United States Patent
Sakamoto et al.

(10) Patent No.: US 12,776,518 B2
(45) Date of Patent: *Oct. 27, 2026

(54) LITHIUM SECONDARY BATTERY

(71) Applicant: Panasonic Intellectual Property Management Co., Ltd., Osaka (JP)

(72) Inventors: Junichi Sakamoto, Osaka (JP); Akira Kano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 720 days.

This patent is subject to a terminal disclaimer.

(21) Appl. No.: 17/745,202

(22) Filed: May 16, 2022

(65) Prior Publication Data

US 2022/0278372 A1 Sep. 1, 2022

Related U.S. Application Data

(63) Continuation of application No. 16/375,903, filed on Apr. 5, 2019, now Pat. No. 11,367,901.

(30) Foreign Application Priority Data

Jun. 1, 2018 (JP) ................................ 2018-106150

(51) Int. Cl.
*H01M 10/052* (2010.01)
*H01M 10/0567* (2010.01)
(Continued)

(52) U.S. Cl.
CPC ..... *H01M 10/0568* (2013.01); *H01M 10/052* (2013.01); *H01M 10/0567* (2013.01);
(Continued)

(58) Field of Classification Search
CPC ............. H01M 4/36; H01M 2004/028; H01M 2300/0025
See application file for complete search history.

(56) References Cited

U.S. PATENT DOCUMENTS 9,543,055 B2 1/2017 Endo et al.
9,601,805 B2 3/2017 He et al.
(Continued)

FOREIGN PATENT DOCUMENTS

JP 2001-243957 9/2001
JP 2004-047231 A 2/2004
(Continued)

OTHER PUBLICATIONS

English Translation of Chinese Search Report dated Dec. 28, 2023 for the related Chinese Patent Application No. 201910443782.9.
(Continued)

*Primary Examiner* — Allison Bourke
*Assistant Examiner* — Charlene Bermudez
(74) *Attorney, Agent, or Firm* — WHDA, LLP

(57) ABSTRACT

A lithium secondary battery according to the present disclosure comprises a cathode, an anode; and a non-aqueous electrolyte having lithium ion conductivity. A lithium metal is precipitated on a surface of the anode during charge of the lithium secondary battery. The lithium metal is dissolved from the surface of the anode in the non-aqueous electrolyte during discharge of the lithium secondary battery. The non-aqueous electrolyte contains a solvent and a lithium salt. The lithium salt includes a first lithium salt and a second lithium salt. The second lithium salt is different from the first lithium salt. The first lithium salt is composed of a lithium ion and an ate complex anion. A sum of concentration of the
(Continued)

first lithium salt and the second lithium salt which are contained in the non-aqueous electrolyte is not less than 3.0 mol/L.

17 Claims, 2 Drawing Sheets

(51) Int. Cl.
*H01M 10/0568* (2010.01)
*H01M 10/0569* (2010.01)
(52) U.S. Cl.
CPC .................. *H01M 10/0569* (2013.01); *H01M 2300/0028* (2013.01); *H01M 2300/0091* (2013.01)

(56) References Cited

U.S. PATENT DOCUMENTS

| | | | | |
|---|---|---|---|---|
| 2004/0081895 | A1 | 4/2004 | Adachi et al. | |
| 2006/0240322 | A1 | 10/2006 | Xu et al. | |
| 2009/0023074 | A1 | 1/2009 | Matsui et al. | |
| 2014/0342249 | A1 | 11/2014 | He et al. | |
| 2014/0363746 | A1 | 12/2014 | He et al. | |
| 2015/0024121 | A1 | 1/2015 | He et al. | |
| 2017/0214091 | A1 | 7/2017 | Abe et al. | |
| 2017/0222268 | A1 | 8/2017 | Abe et al. | |
| 2017/0331152 | A1 | 11/2017 | Kim et al. | |
| 2017/0338471 | A1* | 11/2017 | Zheng | H01M 4/5825 |
| 2018/0226686 | A1 | 8/2018 | Tanaka et al. | |
| 2019/0198865 | A1* | 6/2019 | Kim | H01M 4/485 |
| 2019/0393556 | A1* | 12/2019 | Matsuoka | H01M 10/425 |

FOREIGN PATENT DOCUMENTS

| | | | |
|---|---|---|---|
| JP | 2008-539548 | A | 11/2008 |
| JP | 2015-079636 | | 4/2015 |
| JP | 2016-219393 | | 12/2016 |
| JP | 2017-079193 | A | 4/2017 |
| JP | 2018-505538 | A | 2/2018 |
| JP | 2018-190624 | A | 11/2018 |
| WO | 2006/115023 | | 11/2006 |
| WO | WO2016130484 | A1 | 8/2016 |
| WO | 2017/026094 | | 2/2017 |

OTHER PUBLICATIONS

Extended European Search Report dated Aug. 16, 2019 for the related European Patent Application No. 19167524.8.

Reza Younesi, Fanny Barde; "Electrochemical performance and interfacial properties of Li-metal in lithium bis (fluorosulfonyl)imide based electrolytes"; nature.com/scientificreports, 7: 15925 (Year: 2017).

Xuehui Shangguan, Guofeng Jia, Faqiang Li, Qinglei Wang, and Bin Baie; "Mixed Salts of LiFSI and LiODFB for Stable LiCoO2-Based Batteries", Journal of Electrochemical Society, 163 (Year: 2016).

Non-Final Office Action issued in U.S. Appl. No. 16/375,903, dated Oct. 14, 2020.

Final Office Action issued in U.S. Appl. No. 16/375,903, dated Feb. 21, 2021.

Non-Final Office Action issued in U.S. Appl. No. 16/375,903, dated Aug. 4, 2021.

Notice of Allowance issued in U.S. Appl. No. 16/375,903, dated Mar. 9, 2022.

* cited by examiner

LITHIUM SECONDARY BATTERY

CROSS-REFERENCE OF RELATED APPLICATIONS

This application is a Continuation of U.S. patent application Ser. No. 16/375,903, filed on Apr. 5, 2019, which claims the benefit of Japanese Patent Application No. 2018-106150, filed on Jun. 1, 2018, the entire disclosures of which applications are incorporated by reference herein.

BACKGROUND

1. Technical Field

The present disclosure relates to a lithium secondary battery in which a lithium metal is used as an anode active material. More specifically, the present disclosure relates to improvement of a non-aqueous electrolyte in the lithium secondary battery.

2. Description of the Related Art

In the lithium secondary battery, a lithium metal is precipitated on the anode thereof during the charge. On the other hand, during the discharge, the lithium metal is dissolved in a non-aqueous electrolyte.

Since the lithium metal has a high reduction property, a side reaction occurs easily between the lithium metal precipitated on the anode during the charge and the non-aqueous electrolyte. The side reaction lowers a cycle characteristic of the lithium secondary battery. A dendrite of the lithium metal precipitated on the anode further lowers the cycle characteristic.

Patent Literature 1 discloses that a lithium metal precipitating surface of an anode current collector has ten-point average roughness (Rz) of not more than 10 micrometers to prevent the dendrite of the lithium metal from being precipitated.

On the other hand, the non-aqueous electrolyte used for the lithium secondary battery typically contains a solvent and a lithium salt dissolved in the solvent. Patent Literature 1 discloses a non-aqueous electrolyte in which $LiPF_6$ is dissolved at a concentration of 1 mol/L in a mixture solvent of ethylene carbonate and diethyl carbonate (volume ratio 1:1). Patent Literature 2 discloses an electrolyte containing lithium bis(fluorosulfonyl)imide having a concentration of 0.7-4 mol/L, cyclic carbonate having a volume ratio of more than 0% and not more than 15%, and chain carbonate having a concentration of not less than 85% and not more than 99%.

Patent Literature 3 discloses an energy storage device having a non-aqueous electrolytic solution containing a first lithium salt such as $LiPF_6$, a second lithium salt, and a tertiary carboxylic acid ester. An example of the second lithium salt is at least two kinds selected from the group consisting of a lithium salt having an oxalic acid structure, a lithium salt having a phosphoric acid structure, and a lithium salt having an S═O group.

CITATION LIST

Patent Literature

[Patent Literature 1] Japanese Patent Application Publication No. 2001-243957

[Patent Literature 2] Japanese Patent Application Publication No. 2015-079636

[Patent Literature 3] United States Patent Application Publication No. 2017/0214091

SUMMARY

The present disclosure provides a lithium secondary battery excellent in a cycle characteristic.

The lithium secondary battery according to the present disclosure comprises:

a cathode;

an anode; and a non-aqueous electrolyte having lithium ion conductivity, wherein a lithium metal is precipitated on a surface of the anode during charge of the lithium secondary battery;

the lithium metal is dissolved from the surface of the anode in the non-aqueous electrolyte during discharge of the lithium secondary battery;

the non-aqueous electrolyte contains a solvent and a lithium salt;

the lithium salt includes a first lithium salt and a second lithium salt;

the second lithium salt is different from the first lithium salt;

the first lithium salt is composed of a lithium ion and an ate complex anion; and a sum of concentration of the first lithium salt and the second lithium salt which are contained in the non-aqueous electrolyte is not less than 3.0 mol/L.

The lithium secondary battery according to the present disclosure is excellent in a cycle characteristic.

DETAILED DESCRIPTION OF THE EMBODIMENT

Figure 1A:
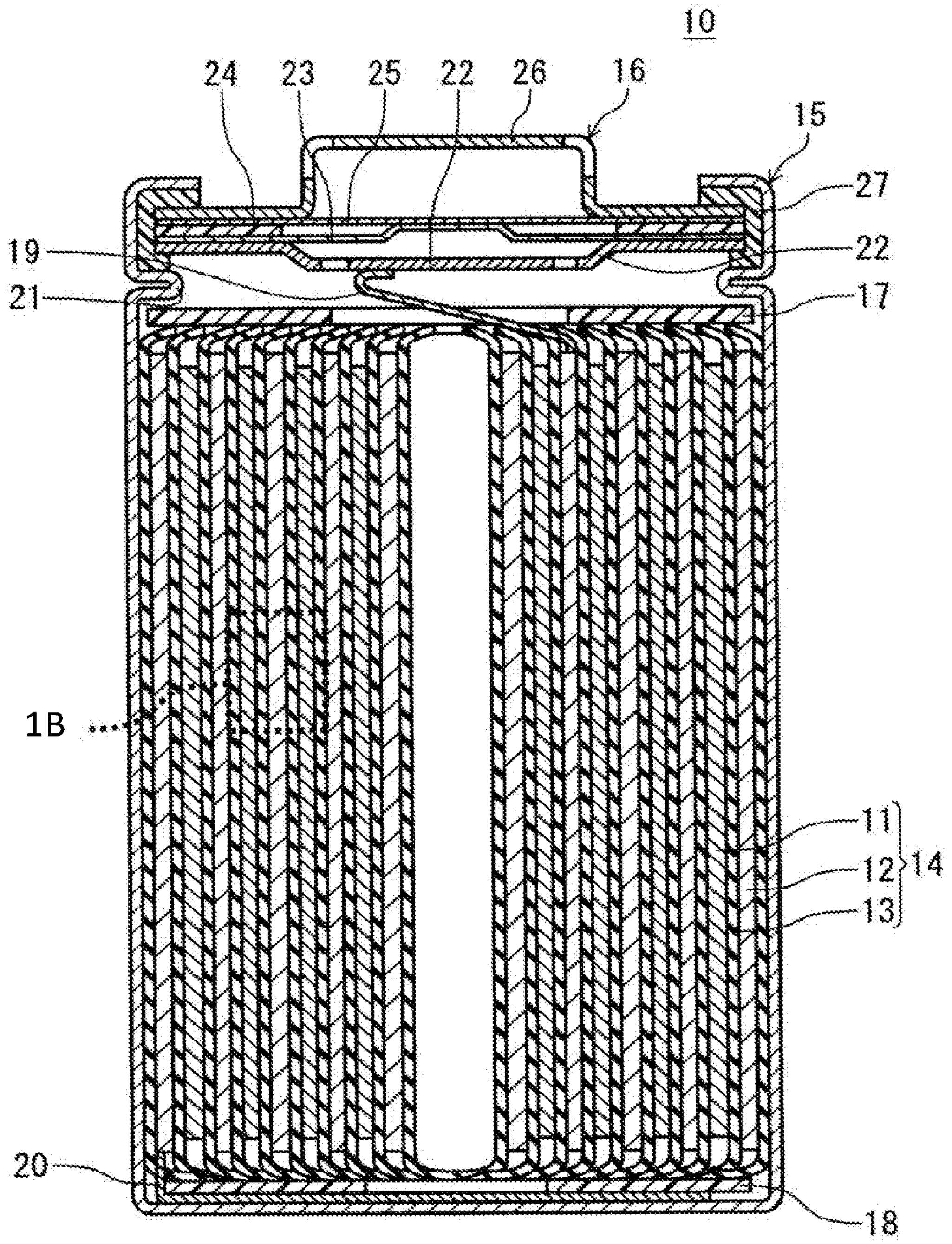
FIG. 1A shows a vertical cross-sectional view of a lithium secondary battery according to the embodiment.

Hereinafter, the lithium secondary battery according to the embodiment will be described with reference to the drawings. The lithium secondary battery according to the present embodiment comprises a cathode, an anode, and a non-aqueous electrolyte having lithium ion conductivity.

(Non-Aqueous Electrolyte)

The non-aqueous electrolyte has lithium ion conductivity. The non-aqueous electrolyte contains a lithium salt and a solvent. The lithium salt is comprised of a lithium ion and an anion. The lithium salt dissolves in the solvent. Typically, the lithium salt dissociates in the non-aqueous electrolyte and is present as a lithium ion and an anion. Typically, the non-aqueous electrolyte is liquid.

The lithium salt is dissolved in the solvent to prepare the liquid non-aqueous electrolyte. The lithium salt is dissolved in the solvent to generate lithium ions and anions; however, the non-aqueous electrolyte may contain an undissociated lithium salt.

As long as a diffusion property of the lithium ions on the surface of the anode is not inhibited, the non-aqueous electrolyte may contain not only the liquid non-aqueous electrolyte but also a matrix polymer. An example of the matrix polymer is a polymer material which serves as a thickener by absorbing the solvent. An example of the polymer material is a fluororesin, an acrylic resin, or a polyether resin.

In the lithium secondary battery according to the present embodiment, the lithium salt contained in the non-aqueous electrolyte includes a first lithium salt and a second lithium salt. The first lithium salt is composed of a lithium ion and an ate complex anion. The second lithium salt is a lithium salt other than the first lithium salt. In other words, the second lithium salt has a different composition from that of the first lithium salt.

The sum of concentration of the first lithium salt and the second lithium salt is not less than 3.0 mol/L. Hereinafter, the sum of the concentration of the first lithium salt and the second lithium salt is referred to as "sum concentration". Since the sum concentration is not less than 3.0 mol/L, lithium ions in large amounts are supplied to the surface of the anode. As a result, a high diffusion property of the lithium ions is ensured. Since the lithium ions in large amounts are supplied to the surface of the anode, the function of the first lithium salt is exhibited effectively. This allows a solid electrolyte interface layer (hereinafter, referred to as "SEI layer") having a good layer quality to be formed more uniformly. The SEI layer proceeds charge-discharge reaction more uniformly. As a result, a lithium secondary battery having a high cycle characteristic is provided.

(Solvent)

Typically, as a solvent, a non-aqueous solvent is used. An example of the non-aqueous solvent is ether, ester, nitrile, amide, or a halogen substitute thereof. Two or more kinds of the non-aqueous solvents may be used for the non-aqueous electrolyte. The halogen substitute has a chemical structure in which at least one hydrogen atom included in ether, ester, nitrile or amide is substituted with a halogen atom. The halogen atom means a fluorine atom, a chlorine atom, a bromine atom, and an iodine atom.

It is desirable that the solvent is ether. An oxygen atom included in an ether structure interacts with the lithium ion strongly. For this reason, desolvation energy of the ether to the lithium ion is increased. If the desolvation energy of the ether is large, the lithium ion is captured by an ether molecule. As a result, across the board, the lithium ion is hardly reduced to a lithium metal on the surface of the anode. However, in the present embodiment, since the sum concentration of the first lithium salt and the second lithium salt is a high value of not less than 3.0 mol/L, the lithium ions in large amount are supplied to the surface of the anode. For this reason, a diffusion-limited access of the lithium ions on the surface of the anode is alleviated, and transport property of the lithium ions is improved. Hence, even in a case where the solvent containing ether is used, the lithium ions are hardly solvated by the ether molecule. As a result, the charge and the discharge proceeds easily and more uniformly.

The lowest unoccupied molecular orbital (hereinafter, referred to as "LUMO") of ether is present at high energy level. For this reason, even in a case where ether is brought into contact with a lithium metal, which has a strong reduction property, the ether is hardly reduced and decomposed. Hence, even in a case where the solvent containing ether is used, the effect of the formation of the SEI layer using the first lithium salt is exhibited sufficiently. From this viewpoint, the effect of the improvement of the cycle characteristic is further raised, in a case where the solvent containing ether is used as a main solvent. The effect is significantly exhibited, in a case where the solvent containing ether as a main solvent is used. In a case where the solvent containing ether as the main solvent is used, the solubility of the first lithium salt and the second lithium salt is improved.

Ether is represented by the following chemical formula (1)

$$R^1 \leftarrow\!\!(O - R^3)_m\!\!\rightarrow O - R^2 \quad (1)$$

where $R^3$ is an alkylene group and m is an integer of not less than 0)

$R^1$ may be a hydrocarbon group or an organic group containing a hetero atom. $R^2$ may also be a hydrocarbon group or an organic group containing a hetero atom. An example of the hydrocarbon group is an aliphatic hydrocarbon group such as an alkyl group, an alicyclic hydrocarbon group, or an aromatic hydrocarbon group. An example of the hetero atom contained in the organic group is an oxygen atom, a sulfur atom, a nitrogen atom, or a silicon atom. The organic group may be an aliphatic organic group containing the hetero atom or a heterocycle group containing the hetero atom as an atom which forms the ring.

$R^3$ may be a hydrocarbon group or an alkylene group. The carbon number of the aklylene group is, for example, not less than 1 and not more than 4, not less than 2 and not more than 4, or not less than 2 or not more than 3.

The value of m may be an integer of not less than 0 and not more than 6 or not less than 0 and not more than 3 in view of high ion conductivity.

In view of high fluidity of the non-aqueous electrolyte, a dialkoxy alkane may be used. The dialkoxy alkane has a chemical structure in which $R^1$ and $R^2$ are hydrocarbon groups and m is equal to 1 in the chemical formula (1). In the dialkoxy alkane, at least one of $R^1$-$R^3$ may have the above-mentioned organic group. In view of the high fluidity, the dialkoxy alkane in which any $R^1$-$R^3$ do not have the organic group may be used. Each of the carbon numbers of the alkyl groups of $R^1$ and $R^2$ is, for example, not less than 1 and not more than 6, not less than 1 and not more than 4, or not less than 1 and not more than 2. Di$C_1$-$C_4$alkoxy$C_{2-4}$alkane (i.e., ether in which $R^1$ is an alkyl group having a carbon number of not less than 1 and not more than 4, $R^2$ is an alkyl group having a carbon number of not less than 1 and not more than 4, $R^3$ is an alkylene group having a carbon number of not less than 2 and not more than 4, and m is equal to 1) has high fluidity. For this reason, even in a case where the concentration of the lithium salt contained in the solvent of the Di$C_1$-$C_4$alkoxy$C_{2-4}$alkane is increased, the non-aqueous electrolyte has high ion conductivity.

An example of the ether is cyclic ether or chain ether. Two or more kinds of ethers may be used in combination. Since ether has high resistance against reduction, even in a case where ether is subjected to a low electric potential circumstance on the surface of the anode, ether is hardly decomposed. For this reason, ether is used as the non-aqueous electrolyte to improve the effect that the side reaction generated between the non-aqueous electrolyte and the lithium salt is inhibited.

An example of the cyclic ether is 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, or crown ether.

An example of the chain ether is diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-dimethoxyethane, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, ortetraethylene glycol dimethyl ether.

An example of the ester is carbonate ester or carboxylate ester.

An example of cyclic carbonate ester is ethylene carbonate, propylene carbonate, butylene carbonate, fluoroethylene carbonate, vinylethylene carbonate, or vinylene carbonate.

An example of chain carbonate ester is dimethyl carbonate, ethyl methyl carbonate, diethyl carbonate, methyl propyl carbonate, ethyl propyl carbonate, or methyl isopropyl carbonate.

An example of cyclic carboxylate ester is γ-butyrolactone or γ-valerolactone.

An example of chain carboxylate ester is methyl acetate, ethyl acetate, propyl acetate, methyl propionate, ethyl propionate, or methyl fluoropropionate.

In view of the easy formation of the SEI layer having a uniform layer quality on the surface of the anode, at least one selected from the group consisting of ethylene carbonate, vinylene carbonate, fluoroethylene carbonate, and vinylethylene carbonate may be used.

An example of the nitrile is acetonitrile, propionitrile, or benzonitrile.

An example of the amide is dimethylformamide or dimethylacetamide.

The solvent of the non-aqueous electrolyte may contain ether as a main solvent. "Ether is a main solvent" means that a volume ratio of the ether to the entire solvent is not less than 50%. The volume ratio may be not less than 60%, not less than 70%, not less than 80% or not less than 90%. The solvent may be composed only of ether.

In the present embodiment, the volume ratio of the solvent to the entire solvent is a volume ratio at 25 degrees Celsius.

(Lithium Salt)

(First Lithium Salt)

The anion of the first lithium salt is an anion of the ate complex. An example of the anion of the ate complex is an anion including at least one selected from the group consisting of a boron atom and a phosphorus atom. The salt composed of the anion of the ate complex and a lithium ion is represented by a chemical formula $LiBX_4$ or $LiPX_6$ (where X is a ligand having high electronegativity). An example of X is a fluorine atom or an oxygen-containing ligand. X may be a monodentate ligand. Alternatively, X may be a multidentate ligand. An example of the oxygen-containing ligand is an oxalate ligand represented by the chemical formula $^-OOC—COO—$. An example of the anion of the ate complex having the oxalate ligand is a bis(oxalate) borate anion represented by the chemical formula $[B(OOC—COO)_2]^-$.

An example of the anion of the first lithium salt is a bis(oxalate)borate anion represented by the chemical formula $B(C_2O_4)_2^-$ or difluoro(oxalate)borate anion represented by the chemical formula $BF_2(C_2O_4)^-$. In view of the formation of the thin and dense SEI layer, an anion including a fluorine atom may be used. The anion including a fluorine atom is used to form the SEI layer containing the fluorine atom.

An example of the anion of the ate complex is represented by the following chemical formulas (I)-(IV).

(I)

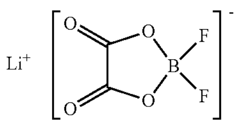

(II)

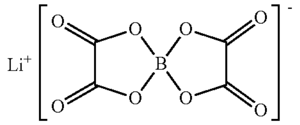

(III)

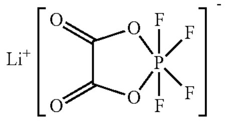

(IV)

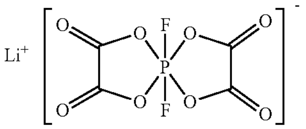

The first lithium salt may include one kind of the ate complex ions. Alternatively, the first lithium salt may include two or more kinds of ate complex ions. Since the first lithium salt is used, the lithium metal having a relatively large size and a shape of a relatively uniform particle is easily precipitated due to the interaction between the anion and the lithium. At least one selected from the group consisting of a bis(oxalate)borate anion and $BF_2(C_2O_4)^-$ may be used in view of the improvement of the effect that the lithium metal having a shape of a relatively large size is precipitated A concentration of the first lithium salt in the non-aqueous electrolyte is not less than 0.01 mol/L, not less than 0.05 mol/L, not less than 0.3 mol/L, or not less than 0.5 mol/L. If the concentration of the first lithium salt is not less than 0.01 mol/L, the SEI layer is easily formed more uniformly. In view of high solubility of the second lithium salt, the concentration of the first lithium salt in the non-aqueous electrolyte may be not more than 2 mol/L, not more than 1.5 mol/L, or not more than 1.0 mol/L.

(Second Lithium Salt)

The second lithium salt has a different composition from that of the first lithium salt. As the second lithium salt, a known lithium salt used for the non-aqueous electrolyte of the lithium secondary battery may be used. An example of the anion of the second lithium salt is $BF_4^-$, $ClO_4^-$, $PF_6^-$, $AsF_6^-$, $SbF_6^-$, $AlCl^-$, $SCN^-$, $CF_3SO_3^-$, $CF_3CO_2^-$, or an anion of imide (namely, an anion represented by $R_1CON^-COR_2$, where $R_1$ and $R_2$ are organic groups, each independently). The non-aqueous electrolyte may contain one kind of the anions of imide or two or more kinds of the anions of imide.

An example of the anion of imide is $N(SO_2C_mF_{2m+1})(SO_2C_nF_{2n+1})^-$ (where m and n are, each independently, an integer of not less than 0). The values of m and n may be not less than 0 and not more than 3, each independently. The values of m and n may be 0, 1, or 2, each independently. An example of the anion of imide is $N(SO_2CF_3)_2^-$, $N(SO_2C_2F_5)_2^-$, or $N(SO_2F)_2$–. Hereinafter, $N(SO_2F)_2^-$ is referred to as $FSI^-$. The salt composed of $FSI^-$ and a lithium ion is referred to as LiFSI.

The second lithium salt may be composed of one kind of lithium salts. Alternatively, the second lithium salt may be a mixture of two or more kinds of lithium salts.

(Sum of Concentration of First and Second Lithium Salts)

The sum of the concentration of the first lithium salt and the second lithium salt contained in the non-aqueous electrolyte (namely, "sum concentration") is not less than 3.0 mol/L. The sum concentration may be not less than 3.5 mol/L. If the sum concentration is not less than 3.0 mol/L, the effect of the first lithium salt is exhibited easily to easily form the dense SEI layer more uniformly. In this way, the effect of the cycle characteristic is further improved. In view of appropriate viscosity of the non-aqueous electrolyte, the sum concentration of the first lithium salt and the second lithium salt contained in the non-aqueous electrolyte may be not more than 5 mol/L. The sum concentration may be not more than 4.5 mol/L.

The concentration of the second lithium salt in the non-aqueous electrolyte may be not less than 1.5 mol/L, not less than 2 mol/L, not less than 2.5 mol/L, or not less than 3.0 mol/L. If the concentration of the second lithium salt is not less than 1.5 mol/L, lithium ions in large amount is supplied to the surface of the anode. As a result, the diffusion property of the lithium ions is easily improved, and the lithium metal is precipitated more uniformly on the anode during the charge. Furthermore, the SEI layer derived from the first lithium salt is formed more uniformly. As just described, the effect of the formation of the layer of the first lithium salt is exhibited sufficiently. The concentration of the second lithium salt contained in the non-aqueous electrolyte may be not more than 4.5 mol/L. The concentration may be not more than 4.0 mol/L.

In a case where the salt composed of a lithium ion and the anion of imide is used as the second lithium salt, even in a case where the sum concentration of the first lithium salt and the second lithium salt is a high value of not less than 3.0 mol/L, since the non-aqueous electrolyte liquid is easily prevented from being gelatinized, the lithium ion conductivity is improved easily. The salt composed of the lithium ion and the anion of imide is dissolved easily in the solvent containing ether as the main solvent. For this reason, even in a case where the non-aqueous electrolyte contains the salt at high concentration, since the non-aqueous electrolyte liquid is prevented from being gelatinized, the lithium ion conductivity is improved. In the non-aqueous electrolyte of the lithium secondary battery containing ether as the main solvent, the function of the first lithium salt with regard to the cycle characteristic in a case where the concentration of the salt composed of the lithium ion and the anion of imide is not less than 1.5 mol/L is quite different from the function in a case where the concentration is less than 1.5 mol/L. For this reason, the concentration of the salt composed of the lithium ion and the anion of imide may be not less than 1.5 mol/L, not less than 2 mol/L, not less than 2.5 mol/L, or not less than 3.0 mol/L.

In a case where the salt composed of a lithium ion and an anion other than the anion of imide is used as the second lithium salt, the concentration of the second lithium salt is, for example, not more than 0.5 mol/L, not more than 0.1 mol/L, or not more than 0.01 mol/L. The non-aqueous electrolyte may contain only the salt composed of the lithium ion and the anion of imide, as the second lithium salt. In these cases, the effect provided by the first lithium salt and the second lithium salt is further exhibited to further improve the cycle characteristic. Such an effect is exhibited effectively, especially in a case where the solvent containing ether as the main solvent is used.

The concentration of each of the lithium salts in the non-aqueous electrolyte is the sum of the concentration of lithium ions derived from the dissociated lithium salt (namely, ionized lithium atoms) and the concentration of the lithium salt which has not yet dissociated (namely, unionized lithium atoms).

(Others)

The non-aqueous electrolyte may contain an additive. An example of the additive is vinylene carbonate, fluoroethylene carbonate, or vinylethylene carbonate. One kind of the additives may be used. Alternatively, two or more kinds of the additives may be used.

The additive may be decomposed at a lower electric potential than a potential in a case where the first lithium salt is decomposed to form a thin film on the anode. The thin film derived from the additive is formed on the anode. In this way, the charge-discharge reaction further proceeds uniformly. In a case where the thin film derived from the additive is formed on the SEI layer derived from the first lithium salt, the uniformity of the SEI layer is further improved. As a result, the charge-discharge reaction further proceeds uniformly. Hence, since the dendrite is prevented from being formed, the volume change of the anode due to the charge and the discharge is prevented. As a result, the lithium secondary battery according to the present embodiment has high discharge capacity, and the cycle characteristic of the lithium secondary battery according to the present embodiment is further prevented from being lowered.

(Findings which Established the Foundation of the Present Disclosure)

In the lithium secondary battery, ions contained in the non-aqueous electrolyte receives electrons on the anode during the charge to precipitate a lithium metal on the anode. The precipitated lithium metal is dissolved in the non-aqueous electrolyte during the discharge. The precipitation and the dissolution of the lithium metal are conducted during the charge and the discharge, respectively. Since a lithium metal has a significantly reduction property, the side reaction of the lithium metal with the non-aqueous electrolyte occurs easily. Except in a full discharge state, the anode of the lithium secondary battery has a lithium metal constantly. For this reason, in the lithium secondary battery, the lithium metal is almost always in contact with the non-aqueous electrolyte. So, the side reaction between the lithium metal and the non-aqueous electrolyte is often generated.

In the lithium secondary battery, the dendrite of the lithium metal is easily precipitated. The precipitated dendrite of the lithium metal increases the specific surface area of the lithium metal. In this way, the side reaction between the lithium metal and the non-aqueous electrolyte occurs more easily. As a result, the discharge capacity is lowered significantly to lower the cycle characteristic significantly.

One of reasons for the precipitation of the dendrite of the lithium metal is, as a first reason, that the lithium ions are easily diffused ununiformly on the anode. Electrocrystallization reaction of the lithium metal generated on the anode during the charge is roughly divided into a diffusion process of the lithium ions onto the surface of the anode and an electron migration process generated on the surface of the anode. In a case of the diffusion-limited access in which the diffusion process proceeds significantly lower than the electron migration process, the amount of the lithium ions which will be used for the electrocrystallization reaction may be insufficient locally. In this case, the electrocrystallization reaction occurs preferentially at a part where the lithium ions are present. So, the dendrite of the lithium metal tends to be precipitated easily.

As a second reason, the thickness of the SEI layer formed on the anode during the charge tends to be ununiform. The SEI layer is formed by decomposition and/or reaction of the component contained in the electrolyte. On the anode of the lithium secondary battery, during the charge, while the lithium metal is precipitated, the SEI layer is formed. So, the thickness of the SEI layer tends to be ununiform. A crystal defect may be generated in the SEI layer.

The crystal defect generated in the SEI layer decreases a resistance value at the crystal defect. So, during the charge, the lithium ions travels through the crystal defect (i.e., a part where the resistance value is decreased) to reach an anode current collector or an anode active material. In this way, the lithium metal is precipitated. In a case where the lithium metal is precipitated ununiformly on the anode, stress is applied to the SEI layer locally by the precipitated lithium metal. A weak part of the SEI layer is destroyed by the stress preferentially. The lithium metal is precipitated from the destroyed part of the SEI layer in such a manner that the lithium metal is extruded. In this way, the dendrite of the lithium metal is formed.

In view of further uniformalizing the diffusion of the lithium ions on the surface of the anode, it may be proposed that the concentration of the lithium salt in the non-aqueous electrolyte is raised to supply the lithium ions in large amount to the surface of the anode. However, the raise in the concentration of the lithium salt may raise the viscosity of the non-aqueous electrolyte excessively and may lower the ion conductivity of the non-aqueous electrolyte. The non-aqueous electrolyte containing the lithium salt at a high concentration causes the layer quality of the SEI layer to be ununiform. As a result, the SEI layer is easily weakened. For this reason, the stress is applied due to local precipitation of the lithium metal to destroy the SEI layer. In this way, the SEI layer tends to be further uniformalized. This causes the lithium metal to be precipitated more ununiformly.

On the other hand, as disclosed in Patent Literature 1, in a conventional lithium secondary battery, a lithium salt which is easily dissociated (e.g., $LiPF_6$) is used as a non-aqueous electrolyte and a carbonate is mainly used as a solvent. As disclosed in Patent Literature 2, a carbonate is often used as a solvent of a non-aqueous electrolyte in a lithium ion battery. In Patent Literature 2, a lithium salt of imide is used as the non-aqueous electrolyte. In Patent Literature 3, two or more kinds of lithium salts having an oxalic acid structure or a phosphoric acid structure are used at a predetermined concentration in combination with a lithium salt such as $LiPF_6$ to prevent impedance subsequent to high-temperature storage from being increased.

However, the present inventors found that the function of the lithium salt is different depending on the concentration of the lithium salt in the non-aqueous electrolyte and that the behavior of the cycle characteristic is varied significantly. Hereinafter, the findings will be described in more detail.

In a case where the first lithium salt of the ate complex anion and the lithium ion is used, even if the second lithium salt which is different from the first lithium salt is combined, in case where the sum concentration of the first lithium salt and the second lithium salt is less than 3.0 mol/L, the cycle characteristic is lowered. However, the present inventors found that in a case where the sum concentration of the first lithium salt and the second lithium salt is not less than 3.0 mol/L, the cycle characteristic in the case where the first lithium salt and the second lithium salt are used in combination is significantly improved, compared to the case where the sum concentration is less than 3.0 mol/L. As just described, in the non-aqueous electrolyte of the lithium secondary battery, the behavior of the cycle characteristic may be significantly different, depending on the sum concentration of the first lithium salt and the second lithium salt.

The detail of the reason why the cycle characteristic is lowered in case where the non-aqueous electrolyte in which the first lithium salt and the second lithium salt are contained and the sum concentration thereof is less than 3.0 mol/L is not clear, however, the detail of the reason presumed by the present inventors will be described below.

In the lithium secondary battery, the lithium salt is often in contact with the non-aqueous electrolyte. So, the side reaction often occurs. In case where the lithium salt has a low concentration, the lithium ions in sufficient amount are hardly supplied rapidly to the surface of the anode. In such a state, on the surface of the anode, the lithium metal is easily precipitated locally and the contact area of the lithium salt and the non-aqueous electrolyte is increased easily. The good SEI layer is easily formed with the first lithium salt; however, in case where the lithium metal is precipitated ununiformly on the surface of the anode, the first lithium salt is easily reduced and decomposed. Besides, the SEI layer derived from the first lithium salt tends to be ununiform. In case where the ununiform SEI layer is formed, the lithium metal is precipitated more ununiformly. Hence, the cycle characteristic is significantly lowered.

In the lithium secondary battery, as above described, since the lithium metal is precipitated and dissolved on the anode during the charge and the discharge, respectively, volume change due to the swelling and the contraction of the anode during the charge and the discharge is significant. In case where the anode is swelled to a large extent during the charge, from the effect of the stress generated due to the swelling, a crack occurs in the electrode, and/or the electrode is broken. The cycle characteristic may be lowered due to such damage to the electrode.

The present inventors provided the lithium secondary battery according to the present disclosure on the basis of the above-mentioned problem and the difference of the behaviors in the cycle characteristic.

The lithium secondary battery according to one aspect of the present disclosure comprises a cathode, an anode, and a non-aqueous electrolyte having lithium ion conductivity. On the anode, a lithium metal is precipitated during charge, whereas the lithium metal is dissolved in the non-aqueous electrolyte during discharge. The non-aqueous electrolyte contains a solvent and a lithium salt. The lithium salt includes a first lithium salt and a second lithium salt. The first lithium salt is a salt of a lithium ion and an ate complex anion. The sum concentration of the first lithium salt and the second lithium salt in the non-aqueous electrolyte is not less than 3.0 mol/L.

In the above-mentioned aspect, in the lithium secondary battery, the first lithium salt and the second lithium salt are used in combination, and the sum concentration of these lithium salts is not less than 3.0 mol/L. In this way, the cycle characteristic is significantly improved. The detail of the reason why the cycle characteristic is improved is not clear; however, the detail of the reason presumed by the present inventors will be described below.

Since the sum concentration of the first lithium salt and the second lithium salt is high, the lithium ions in large amount are supplied to the surface of the anode. For this reason, a diffusion-limited access of the lithium ions on the surface of the anode is alleviated, and transport property of the lithium ions is improved. Hence, the local precipitation of the lithium metal is prevented. Since the lithium salt in large amount is supplied to the surface of the anode, the effect provided by the second lithium salt would be exhibited sufficiently to form the dense thin SEI layer more uniformly on the surface of the anode. For this reason, an original point of the precipitation of the lithium metal is further uniformalized. So, the dendrite of the lithium salt is prevented from being precipitated. Hence, the contact area of the lithium metal and the non-aqueous electrolyte is prevented from being increased excessively, and the reduction and the decomposition of the second lithium salt is inhibited. As a result, the charge-discharge reaction is conducted more uniformly. Since the charge-discharge reaction is conducted more uniformly and the dendrite of the lithium metal is prevented from being generated, the volume change due to the swelling and the contraction of the electrode is suppressed. For these reasons, the cycle characteristic would be improved.

(Structure of Lithium Secondary Battery)

The lithium secondary battery comprises a cathode, an anode, and a non-aqueous electrolyte. Typically, a separator is provided between the cathode and the anode. Hereinafter, the structure of the lithium secondary battery will be described with reference to the drawings.

Figure 1B:
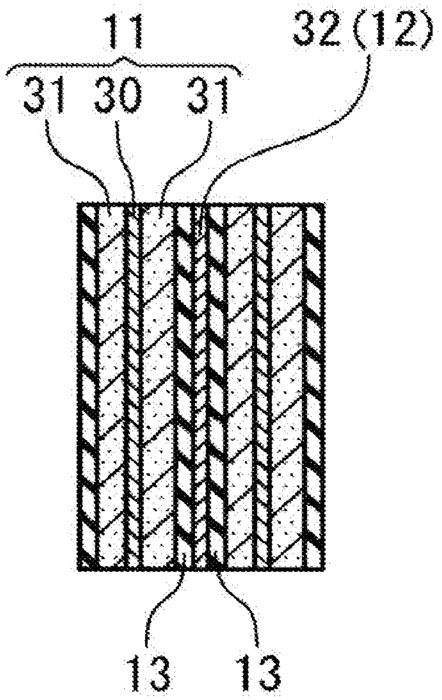
FIG. 1B shows an enlarged cross-sectional view taken along the line 1B included in FIG. 1A in a full discharge state of the lithium secondary battery.

FIG. 1A shows a vertical cross-sectional view of a lithium secondary battery according to the embodiment. FIG. 1B shows an enlarged cross-sectional view taken along the line 1B included in FIG. 1A in a full discharge state of the lithium secondary battery.

The lithium secondary battery 10 is a cylindrical battery comprising a cylindrical battery case, a rolled electrode group 14 stored in the battery case, and a non-aqueous electrolyte (not shown). The battery case comprises a case main body 15 which is a cylindrical metallic container having a bottom and a sealed body 16 which seals an opening of the case main body 15. A gasket 27 is provided between the case main body 15 and the sealed body 16. In this way, the sealability of the battery case is ensured. In the case main body 15, insulation plates 17 and 18 are provided with one and the other lateral surfaces of the rolled electrode group 14, respectively.

The case main body 15 has a recess part 21 formed by partially pressing a lateral surface of the case main body 15 from the outside thereof. The recess part 21 may be formed circularly on the lateral surface of the case main body 15 along the circumferential direction of the case main body 15. In this case, the sealed body 16 is supported on a surface which faces the opening of the recess part 21.

The sealed body 16 comprises a filter 22, a lower valve body 23, an insulation member 24, an upper valve body 25, and a cap 26. In the sealed body 16, these members are stacked in this order. The sealed body 16 is attached to the opening of the case main body 15 in such a manner that the cap 26 is located on the outside of the case main body 15 and that the filter 22 is located in the inside of the case main body 15. Each of the above-mentioned members included in the sealed body 16 is, for example, cylindrical or ring-shaped. Each of the members except for the insulation member 24 is electrically connected to one another.

The electrode group 14 comprises a cathode 11, an anode 12, and a separator 13. The cathode 11, the anode 12, and the separator 13 are belt-shaped. The cathode 11 and the anode 12 are rolled in a swirl shape in a state where the separator 13 is interposed therebetween in such a manner that the width direction of the belt-shaped cathode 11 and anode 12 are parallel to a rolling axis. In a cross section perpendicular to the rolling axis of the electrode group 14, the cathode 11 and the anode 12 are stacked alternately in a radius direction of the electrode group 14 in a state where the separator 13 is interposed therebetween.

The cathode 11 is electrically connected to the cap 26 which also serves as a cathode terminal through a cathode lead 19. The one end of the cathode lead 19 is electrically connected to the belt-shaped cathode 11. The cathode lead 19, which extends from the cathode 11, extends to the filter 22 through a through hole (not shown) formed in the insulation plate 17. The other end of the cathode lead 19 is welded on a surface of the filter 22 which faces the electrode group 14.

The anode 12 is electrically connected to the case main body 15 which also serves as an anode terminal through an anode lead 20. The one end of the anode lead 20 is electrically connected to the belt-shaped anode 12. The other end of the anode lead 20 is welded on an inner surface of the bottom of the case main body 15.

As shown in FIG. 1B, the cathode 11 comprises a cathode current collector 30 and cathode composite layers 31 provided on the both of surfaces of the cathode current collector 30. The anode 12 comprises an anode current collector 32. On the anode 12 of the lithium secondary battery 10, the lithium metal is precipitated during the charge. On the other hand, the precipitated lithium metal is dissolved in the non-aqueous electrolyte during the discharge.

(Cathode 11)

The cathode 11 comprises, for example, the cathode current collector 30 and the cathode composite layer 31 provided on the cathode current collector 30. The cathode composite layer 31 may be formed on each of the both of the surfaces of the cathode current collector 30. The cathode composite layer 31 may be formed on one of the surfaces of the cathode current collector 30.

The cathode composite layer 31 contains a cathode active material as an essential component. The cathode composite layer 31 may contain an electrical conducting agent, a binder, and an additive. An electrically conductive carbon material may be provided between the cathode current collector 30 and the cathode composite layer 31.

The cathode 11 is provided, for example, by applying a slurry containing a component of the cathode composite layer 31 and a dispersion medium to the surface of the cathode current collector 30, and drying a film, and then, pressing. An example of the dispersion medium is water, an organic medium, or the mixture thereof. The electrically conductive carbon material may be applied on the surface of the cathode current collector 30.

The cathode active material stores and releases the lithium ions. An example of the cathode active material is a lithium-containing transition metal oxide, a transition metal fluoride, a polyanion, a fluorinated polyanion, or a transition metal sulfide. In view of high average discharge voltage and cost reduction, it is desirable that the cathode active material is a lithium-containing transition metal oxide.

An example of a transition metal element included in the lithium-containing transition metal oxide is Sc, Ti, V, Cr, Mn, Fe, Co, Ni, Cu, Y, Zr, or W. The lithium-containing transition metal oxide may contain one kind of the transition metal elements. Alternatively, the lithium-containing transition metal oxide may contain two or more kinds of the transition metal elements. The lithium-containing transition metal oxide may contain a typical metal element. An example of the typical metal element is Mg, Al, Ca, Zn, Ga, Ge, Sn, Sb, Pb, or Bi. The lithium-containing transition metal oxide may contain one kind of the typical metal elements. Alternatively, the lithium-containing transition metal oxide may contain two or more kinds of the typical metal elements.

A crystal structure of the cathode active material is not limited. An example of the crystal structure of the cathode active material is a crystal structure which belongs to a space group R-3m. The cathode active material having a crystal structure which belongs to the space group R-3m is hardly deteriorated even in the non-aqueous electrolyte. This is because the swelling and the contraction of the lattice of the crystal structure which belongs to the space group R-3m due to the charge and discharge is relatively small. As a result, the excellent cycle characteristic is easily provided.

The lithium secondary battery according to the present embodiment may be assembled in a discharged state. The cathode active material having a crystal structure which belongs to the space group R-3m may be an oxide containing at least one selected from the group consisting of Ni, Co, Mn, and Al. In the cathode active material formed of such an oxide, a ratio of the number of atoms of Ni to the total number of atoms of Ni, Co, Mn, and Al may be not less than 0.5. For example, in a case where the cathode active material contains Ni, Co, and Al, the ratio of the number of atoms of Ni may be not less than 0.5 or not less than 0.8. In a case where the cathode active material contains Ni, Co, and Mn, the ratio of the number of atoms of Ni may be not less than 0.5.

An example of the electrical conducting agent is a carbon material. An example of the carbon materials is carbon black, carbon nanotube, or graphite. An example of the carbon black is acetylene black or ketjen black. The cathode composite layer 31 may contain one kind of the electrical conducting agents. Alternatively, the cathode composite layer 31 may contain two or more kinds of the electrical conducting agents. At least one kind selected from these carbon materials may be used as the conductive carbon material provided between the cathode current collector 30 and the cathode composite layer 31.

An example of the binder is fluororesin, polyacrylonitrile, polyimide resin, acrylic resin, polyolefin resin, or rubbery polymer. An example of fluororesin is polytetrafluoroethylene or polyvinylidene fluoride. One kind of the binders may be contained in the cathode composite layer 31. Alternatively, two or more kinds of the binders may be contained in the cathode composite layer 31.

An example of the material of the cathode current collector 30 is a metal such as Al, Ti, Fe or its alloy such as an Al alloy, a Ti alloy, or a Fe alloy. The Fe alloy may be a stainless steel, which is referred to as SUS. An example of the shape of the cathode current collector 30 is a foil or a film. The cathode current collector 30 may be porous. For example, a metal mesh may be used as the cathode current collector 30.

(Anode 12)

In the anode 12 of the lithium secondary battery 10, the lithium metal is precipitated during the charge. In particular, the lithium ions contained in the non-aqueous electrolyte receive electrons on the anode 12 during the charge to become a lithium metal. The lithium metal is precipitated on the anode 12. The lithium metal precipitated on the anode 12 is dissolved as the lithium ions in the non-aqueous electrolyte during the discharge. The lithium ion contained in the non-aqueous electrolyte is at least one lithium ion selected from the group consisting of the lithium ion derived from the lithium salt added to the non-aqueous electrolyte and the lithium ion supplied from the cathode active material during the charge.

The anode 12 comprises an anode current collector 32. Typically, the anode current collector 32 is composed of a conductive sheet. The conductive sheet may be formed of a lithium metal or a lithium alloy. Alternatively, the conductive sheet may be formed of a conductive material other than the lithium metal and the lithium alloy. The conductive material may be a metal material such as a metal or an alloy thereof. The metal material may be a material which does not react with lithium. Such a material may be a material which reacts with neither the lithium metal nor the lithium ions. In particular, such a material may be a material which forms neither an alloy with lithium nor an intermetallic compound with lithium. An example of the metal material is, for example, copper, nickel, iron, an alloy containing these metal elements. An example of the alloy is a copper alloy or SUS. In view of high conductivity, high capacity, and high charge-and-discharge efficiency, the metal material may be copper and/or a copper alloy. The conductive sheet may contain one of these conductive materials. Alternatively, the conductive sheet may contain two or more of these conductive materials.

An example of the conductive sheet is a foil or a film. The conductive sheet may be porous. In view of high conductivity, the conductive sheet may be a metal foil or a metal foil containing copper. Such a metal foil may be a copper foil or a copper alloy foil. The content of copper contained in the metal foil may be not less than 50% by mass or not less than 80% by mass. As the metal foil, in particular, a copper foil containing substantially only copper as the metal element may be used.

In view of high volume energy density, the anode 12 may include only the anode current collector 32 in a full discharge state of the lithium secondary battery. In this case, the anode current collector 32 may be formed of a material which does not react with lithium. In view of high charge-and-discharge efficiency, in a full discharge state, the anode may comprise the anode current collector and an anode active material layer which is provided on the surface of the anode current collector. In assembling the battery, only the anode current collector 32 may be used as the anode 12. Alternatively, an anode comprising the anode active material layer and the anode current collector may be used.

An example of the anode active material contained in the anode active material layer is (i) a lithium metal, (ii) a lithium alloy, or (iii) a material capable of reversibly storing and releasing the lithium ions. An example of the lithium alloy is a lithium-aluminum alloy. An example of the materials capable of reversibly storing and releasing the lithium ions is a carbon material or an alloy material. An example of the carbon material is a graphite material, soft carbon, hard carbon, or amorphous carbon. An example of the alloy material is a material containing silicon or tin. An example of the material containing silicon is elemental silicon, a silicon alloy, or a silicon compound. An example of the material containing tin is elemental tin, a tin alloy, or a tin compound. An example of the silicon compound is a silicon oxide or a silicon nitride. An example of the tin compound is a tin oxide or a tin nitride.

The anode active material layer may be formed by depositing the anode active material on the surface of the anode current collector by a gas-phase method such as electrodeposition or vapor deposition. The anode active material layer may be formed by coating an anode composition containing the anode active material and the binder on the surface of the anode current collector. The anode composition may contain at least one of the electrical conductive agent, the thickener, and the additive, if necessary.

The thickness of the anode active material layer is not limited. The thickness of the anode active material layer is, for example, not less than 30 micrometers and not more than 300 micrometers in the full discharge state of the lithium secondary battery. The thickness of the anode current collector 32 is, for example, not less than 5 micrometers and not more than 20 micrometers.

In the present specification, the full discharge state of the lithium secondary battery means a state where the lithium secondary battery is discharged until a state of charge reaches not more than 0.05×C, where the rated capacity of the battery is C. “State of charge” is referred to as “SOC”. For example, the full discharge state of the lithium secondary battery means a state in which the lithium secondary battery is discharged to the lower limit voltage at a constant current of 0.05 C. An example of the lower limit voltage is 2.5 volts.

The anode 12 may further include a protective layer. The protective layer may be formed on the surface of the anode current collector 32. In a case where the anode 12 has the anode active material layer, the protective layer may be formed on the surface of the anode active material layer. The protective layer has the effect of allowing the surface reaction of the electrode to be more uniform. The protective layer facilitates the more uniform precipitation of the lithium metal on the anode. The protective layer is composed of, for example, at least one selected from the group consisting of an organic substance and an inorganic substance. As a material of the protective layer, a material which does not inhibit the lithium ion conductivity is selected. An example of the organic substance is a polymer having the lithium ion conductivity. An example of such a polymer is polyethylene oxide or polymethyl methacrylate. An example of the inorganic substance is a ceramic or a solid electrolyte. An example of the ceramic is $SiO_2$, $Al_2O_3$, or MgO.

The material of the solid electrolyte included in the protective layer is not limited. An example of the material of the solid electrolyte included in the protective layer is a sulfide solid electrolyte, a phosphate solid electrolyte, a perovskite solid electrolyte, or a garnet solid electrolyte. In view of low cost and easy availability, it is desirable that the solid electrolyte is a sulfide solid electrolyte or a phosphate solid electrolyte.

The sulfide solid electrolyte contains a sulfur component and has lithium ion conductivity. The sulfide solid electrolyte may contain, for example, S, Li, and a third element. An example of the third element is at least one selected from the group consisting of P, Ge, B, Si, I, Al, Ga, and As. An example of the material of the sulfide solid electrolyte is $Li_2S—P_2S_5$, $70Li_2S\text{-}30P_2S_5$, $80Li_2S\text{-}20P_2S_5$, $Li_2S—SiS_2$, or $LiGe_{0.25}P_{0.75}S_4$.

The phosphate solid electrolyte contains a phosphoric acid component and has lithium ion conductivity. An example of the material of the phosphate solid electrolyte is $Li_{1+X}Al_XTi_{2-X}(PO_4)_3$) ($0<x<2$, for example, $Li_{1.5}Al_{0.5}Ti_{1.5}(PO_4)_3$) or $Li_{1+X}Al_XGe_{2-X}(PO_4)_3$. The value of X may be not more than 1.

(Separator 13)

As the separator 13, a porous sheet having ion permeability and an insulating property is used. An example of the porous sheet is a microporous film, a woven fabric, or a non-woven fabric. The material of the separator is not limited. An example of the material of the separator is a polymer material. An example of the polymer material is olefin resin, polyamide resin, or cellulose. An example of the olefin resin is (i) polyethylene, (ii) polypropylene, or (iii) an olefin copolymer containing at least one of ethylene and propylene as a monomer unit. The separator 13 may contain an additive. An example of the additive is an inorganic filler.

The separator 13 may be a stacking structure. An example of the stacking structure is (i) a stacking structure of a polyethylene microporous film and a polypropylene microporous film, or (ii) a stacking structure of a non-woven fabric containing cellulose fibers and a non-woven fabric containing thermoplastic resin fibers. Another example of the stacking structure is a stacking structure in which a coating film formed of polyamide resin is stacked on the surface of a microporous film, a woven fabric, or a non-woven fabric. Since such a separator 13 has high durability, damage of the separator 13 is suppressed even if pressure is applied to the separator 13 in a state where the separator 13 is in contact with the plurality of protrusion portions. In view of at least one selected from the group consisting of heat resistance and strength, the separator 13 may comprise layers each containing an inorganic filler on the surfaces which face the cathode 11 and the anode 12.

(Others)

In FIG. 1A, the lithium secondary battery is a cylindrical lithium secondary battery including the cylindrical battery case. However, the lithium secondary battery according to the present disclosure is not limited to the lithium secondary battery shown in FIG. 1A. The lithium secondary battery according to the present disclosure may be, for example, a prismatic battery comprising a prismatic battery case. The lithium secondary battery according to the present disclosure may be a laminate battery comprising a resin outer casing such as an aluminum laminate sheet. The electrode group does not have to be rolled. The electrode group may be, for example, a laminated electrode group in which a plurality of the cathode layers and a plurality of the anode layers are alternately stacked in such a manner that the separator is interposed between each of the cathode layers and each of the anode layers.

In the lithium secondary battery comprising the rolled electrode group, the crack may occur in the electrode or the electrode may be broken, due to the stress generated by the swelling of the anode during the charge. The thickness of the electrode of the lithium secondary battery comprising the laminated electrode group significantly increases due to the large swelling of the anode during the charge. However, in the lithium secondary battery according to the present disclosure, since the above-mentioned non-aqueous electrolyte is used, the swelling of the anode is suppressed. Therefore, in a case of using any of the rolled electrode group and the laminated electrode group, the deterioration of the battery characteristics (i.e., the cycle characteristic) due to the swelling of the anode is suppressed.

EXAMPLES

Hereinafter, the present disclosure will be described in more detail with reference to the following inventive examples and comparative examples.

Inventive Examples 1-8, Comparative Examples 1-7, Referential Examples 1-3

The lithium secondary battery having the structure shown in FIG. 1A was produced by the following procedure.

(1) Production of the Cathode 11

The cathode active material, acetylene black, and polyvinylidene fluoride were mixed at a mass ratio of 95:2.5:2.5 to provide a mixture. Acetylene black and polyvinylidene fluoride were served as the electrical conducting agent and the binder. An appropriate amount of N-methyl-2-pyrrolidone was added as the dispersion medium to the mixture, and then, the mixture was stirred to prepare a cathode composition slurry. As the cathode active material, a lithium-containing transition metal oxide containing Ni, Co and Al and having a crystal structure which belonged to the space group R-3m was used.

The cathode composition slurry was applied to both of the surfaces of an aluminum foil used as the cathode current collector 30, and then dried. In this way, a stacking structure was provided. The stacking structure was pressed with a roller in the thickness direction thereof. The thus-pressed stacking structure was cut into a predetermined electrode size to produce the cathode 11 comprising the cathode composite layers 31 provided on the both of the surfaces of the cathode current collector 30. An exposing part of the cathode current collector 30 which did not have the cathode composite layer 31 was formed at a region of a part of the cathode 11. One end of the cathode lead 19 formed of aluminum was welded onto the exposing part of the cathode current collector 30.

(2) Production of the Anode 12

An electrolytic copper foil having a thickness of 10 micrometers was cut into a predetermined electrode size to form the anode current collector 32. The anode current collector 32 was used as the production of the battery as the anode 12. One end of the anode lead 20 formed of nickel was welded to the anode current collector 32.

(3) Preparation of the Non-Aqueous Electrolyte

Lithium salts were dissolved to the solvent as shown in Table 1. In this way, a liquid non-aqueous electrolyte was prepared. The mixture ratio of the solvent shown in Table 1 is a volume ratio.

The solvents and the lithium salts shown in Table 1 will be listed as below.

(a) DME: 1,2-dimethoxyethane represented by the chemical formula $CH_3O(CH_2)_2OCH_3$ (b) FEC: Fluoroethylene carbonate represented by the chemical formula $C_3H_3FO_3$ (c) EMC: Ethyl methyl carbonate represented by the chemical formula $C_2H_5O(C{=}O)OCH_3$ (d) DMC: Dimethyl carbonate represented by the chemical formula $CH_3O(C{=}O)OCH_3$ (e) LiDFOB: Lithium difluoro(oxalate)borate represented by the chemical formula $Li^+[(C_2O_4)BF_2]^-$ (f) LiBOB: Lithium bis(oxalate)borate represented by the chemical formula $Li^+[(C_2O_4)_2B]^-$ (g) LiFSI: Lithium bis(fluorosulfonyl)imide represented by the chemical formula $Li^+[FSO_2N{-}SO_2F]$ (h) $LiPF_6$: Lithium hexafluorophosphate represented by the chemical formula $LiPF_6$ (4) Production of the Battery The cathode 11 provided in the section (1), a microporous film formed of polyethylene (i.e., the separator 13), and the anode 12 provided in the section (2) were stacked in this order in an inert gas atmosphere to provide a stacking structure. The thus-provided stacking structure was rolled in a swirl shape to provide the electrode group 14. The provided electrode group 14 was stored in a bag-shaped outer casing formed of a laminated sheet comprising an Al layer. Then, the non-aqueous electrolyte was poured into the outer casing, and then, the outer casing was sealed. In this way, the lithium secondary battery was produced.

(5) Evaluation

The discharge capacity and the cycle characteristic of the lithium secondary batteries according to the inventive examples, the comparative examples, and the referential examples were evaluated on the basis of the charge-discharge test performed by the following procedure.

First, the lithium secondary battery was charged under the following condition in a thermostat bath maintained at 25 degrees Celsius, and then, the lithium secondary battery was left at rest for 20 minutes. Subsequently, the lithium secondary battery was discharged under the following condition.

(Charge)

The lithium secondary battery was charged at a constant current density of 10 $mA/cm^2$ until the voltage of the battery reached 4.1 volts. Then, the lithium secondary battery was charged at a constant voltage of 4.1 volts until the current density reached 1 $mA/cm^2$.

(Discharge)

The lithium secondary battery was discharged at a constant current density of 10 $mA/cm^2$ until the voltage of the battery reached 3.0 volts.

The charge-and-discharge was repeated 50 times (i.e., 50 cycle). One cycle is composed of a single charge and a single discharge. The discharge capacity at the first cycle was measured as the first discharge capacity. The discharge capacity at the 50th cycle was measured as the final discharge capacity. The ratio of the final discharge capacity to the first discharge capacity was calculated as a capacity maintenance ratio (%), which is used as an index of the cycle characteristic.

The following Table 1 shows the results of the inventive examples 1-8, the comparative examples 1-7, and the referential examples 1-3. In Table 1, T1-T8, C1-C7, and R1-R3 mean the inventive examples 1-8, the comparative examples 1-7, and the referential examples 1-3, respectively.

TABLE 1

| | | First Lithium Salt | | Second Lithium Salt | | Capacity Maintenance Ratio |
|---|---|---|---|---|---|---|
| | Solvent | Abbr. | (mol/L) | Abbr. | (mol/L) | (%) |
| T1 | DME | LiDFOB | 0.5 | LiFSI | 3.5 | 91.2 |
| T2 | | | | | 3.0 | 86.2 |
| T3 | | | | | 2.5 | 80.4 |
| T4 | | | 1.5 | | 1.5 | 80.0 |

TABLE 1-continued

| | Solvent | First Lithium Salt Abbr. | First Lithium Salt (mol/L) | Second Lithium Salt Abbr. | Second Lithium Salt (mol/L) | Capacity Maintenance Ratio (%) |
|---|---|---|---|---|---|---|
| T5 | | | 0.05 | | 3.0 | 80.8 |
| T6 | | | 0.1 | | 3.0 | 83.5 |
| T7 | | LiBOB | 0.1 | | 3.0 | 80.3 |
| T8 | | | 0.05 | | 3.0 | 80.5 |
| C1 | DME | LiDFOB | — | LiFSI | 3.5 | 72.0 |
| C2 | | | — | | 3.0 | 70.8 |
| C3 | | | — | | 2.0 | 55.0 |
| C4 | | | — | | 1.0 | 41.0 |
| C5 | | | 0.5 | | 1.0 | 31.0 |
| C6 | | | 0.5 | | 2.0 | 71.3 |
| C7 | | | 1.5 | | 1.0 | 54.3 |
| R1 | FEC/EMC/DMC 20/5/75(v/v/v) | LiDFOB | 0.5 | $LiPF_6$ | 1.0 | 77.6 |
| R2 | FEC/EMC/DMC 20/5/75(v/v/v) | LiDFOB | 0.5 | LiFSI | 1.0 | 76.6 |
| R3 | FEC/DME 20/80(v/v) | LiDFOB | 0.5 | $LiPF_6$ | 1.0 | 52.3 |

As is clear from comparison of the inventive examples 1-8 to the comparative examples 5-7, in a case where the sum concentration of the first lithium salt and the second lithium salt is not less than 3.0 mol/L, the cycle characteristic is significantly improved, compared to a case where the sum concentration is less than 3.0 mol/L. In the inventive examples 1-8, a high capacity maintenance ratio of more than 80% is provided. The capacity maintenance ratio in the inventive examples 1-8 was higher than the capacity maintenance ratio in the in the comparative examples 1-4 in which the first lithium salt was not used (namely, only the second lithium salt was used). As shown in the comparative example 5, in a case where the sum concentration of the first lithium salt and the second lithium salt was 1.5 mol/L, even if the first lithium salt has a concentration of 0.5 mol/L, the capacity maintenance ratio is 31.0%, which is a significantly lower value than those of the inventive examples 1-8.

As shown in the comparative examples 1-3, in a case where ether is used as the solvent, the capacity maintenance ratio is lowered, compared to the case of using carbonate. However, in a case where the sum concentration of the first lithium salt and the second lithium salt is not less than 3.0 mol/L, even if ether is used, as shown in the inventive examples 1-8, the capacity maintenance ratio is high. In a case where ether is used as the main solvent and where the second lithium salt has a concentration of 1 mol/L, as shown in the comparative example 5, the capacity maintenance ratio was 31.0%, which is a significantly low value. The capacity maintenance ratio of 31% in the comparative example 5 is lower than the capacity maintenance ratio in the comparative example 4, in which the first lithium salt was not used, by no less than 10% (i.e., 41.0%).

As just described, in a case where ether is used as the main solvent and where the second lithium salt has a concentration of 1 mol/L, the addition of the first lithium salt lowers the capacity maintenance ratio by no less than 10%. In a case where the concentration of the second lithium salt is increased, as shown in the comparative example 6, the capacity maintenance ratio is increased to some extent; however, the increase in capacity maintenance ratio is insufficient. However, as shown in the inventive examples 1-8, in a case where the second lithium salt has a concentration of not less than 1.5 mol/L, the addition of the second lithium salt improves the capacity maintenance ratio significantly. The capacity maintenance ratio in the inventive examples 1-3 is higher than the capacity maintenance ratio in the comparative examples 1-3 by no less than 15.4%-25.4%. The concentration of the first lithium salt in the comparative examples 1-3 is the same as the concentration of the first lithium salt in the inventive examples 1-3, respectively; however, note that the first lithium salt was not contained in the comparative examples 1-3. As just described, in a case where ether is used as the main solvent, the second lithium salt having a concentration of not less than 1.5 mol/L raises the capacity maintenance ratio.

Inventive Examples 9-12

In the inventive examples 9-12, a non-aqueous electrolyte was prepared with the solvent shown in Table 2. The lithium secondary battery was produced in the same way as in the inventive example 2, except for using the thus-prepared non-aqueous electrolyte.

The solvents shown in Table 2 will be listed as below.

(h) DEE: 1,2-diethoxyethane represented by the chemical formula $H_5C_2O(CH_2)_2OC_2H_5$ (i) THF: Tetrahydrofuran represented by the chemical formula $C_4H_8O$ (j) FEC: Fluoroethylene carbonate represented by the chemical formula $C_3H_3FO_3$ (k) VC: Vinylene carbonate represented by the chemical formula $C_3H_2O$ In Table 2, T9-T12 mean the inventive examples 9-12, respectively. For reference, Table 2 also includes the result of the inventive example 2 (i.e., T2).

TABLE 2

| | Solvent | First Lithium Salt Abbr. | (mol/L) | Second Lithium Salt Abbr. | (mol/L) | Capacity Maintenance Ratio(%) |
|---|---|---|---|---|---|---|
| T2 | DME | LiDFOB | 0.5 | LIFSI | 3 | 86.2 |
| T9 | DEE | | | | | 83.8 |
| T10 | THF | | | | | 85.6 |
| T11 | DME/FEC 90/10 (v/v) | | | | | 88.8 |
| T12 | DME/VC 95/5 (v/v) | | | | | 87.1 |

As shown in Table 2, even in a case where DEE or THF is used as the solvent, the capacity maintenance ratio is high, similarly to the case of the other inventive examples. Even in a case where DME is used together with FEC or VC, the capacity maintenance ratio is high. The present inventors believed that the capacity maintenance ratio in the inventive examples 11 and 12 was higher than that of the inventive example 2, since the SEI layer was formed on the surface of the anode with FEC and VC.

INDUSTRIAL APPLICABILITY

The lithium secondary battery according to the present disclosure has an excellent cycle characteristic. The lithium secondary battery according to the present disclosure is useful for various uses such as (i) an electronic device such as a mobile phone, a smartphone, or a tablet terminal, (ii) an electric vehicle including a hybrid or a plug-in hybrid, or (iii) a household storage battery which is combined with a solar cell.

REFERENTIAL SIGNS LIST

10 Lithium secondary battery
11 Cathode
12 Anode
13 Separator
14 Electrode group
15 Case main body
16 Sealed body
17 Insulation plate
18 Insulation plate
19 Cathode lead
20 Anode lead
21 Recess part
22 Filter
23 Lower valve body
24 Insulation member
25 Upper valve body
26 Cap
27 Gasket
30 Cathode current collector
31 Cathode composite layer
32 Anode current collector

The invention claimed is:

1. A lithium secondary battery, comprising:
a cathode;
an anode; and
a non-aqueous electrolyte having lithium ion conductivity,
wherein the non-aqueous electrolyte contains
a first lithium salt represented by a chemical formula $LiBX_4$ or $LiPX_6$, where X is a fluorine atom or an oxygen-containing ligand,
a second lithium salt represented by a chemical formula $LiN(SO_2F)_2$, and
an ether represented by a chemical formula $R^1$—O—$R^3$—O—$R^2$, where $R^1$ and $R^2$ are each independently an alkyl group with a carbon number of 1 to 4; and $R^3$ is an alkylene group with a carbon number of 2 to 4,
a sum of concentration of the first lithium salt and the second lithium salt which are contained in the non-aqueous electrolyte is not less than 3.0 mol/L,
a concentration of the first lithium salt contained in the non-aqueous electrolyte is not less than 0.01 mol/L and not more than 2 mol/L, and
a concentration of the second lithium salt contained in the non-aqueous electrolyte is not less than 1.5 mol/L,
wherein a volume ratio of the ether to an entire solvent in the non-aqueous electrolyte is not less than 90%,
wherein a lithium metal is precipitated on a surface of the anode during charge of the lithium secondary battery, and
the lithium metal is dissolved from the surface of the anode in the non-aqueous electrolyte during discharge of the lithium secondary battery.

2. The lithium secondary battery according to claim 1, wherein the non-aqueous electrolyte contains a mixed solvent of the ether and an auxiliary solvent.

3. The lithium secondary battery according to claim 2, wherein the auxiliary solvent is an ester.

4. The lithium secondary battery according to claim 3, wherein the auxiliary solvent is a cyclic carbonate ester.

5. The lithium secondary battery according to claim 4, wherein the auxiliary solvent is at least one selected from the group consisting of ethylene carbonate, vinylene carbonate, fluoroethylene carbonate, and vinylethylene carbonate.

6. The lithium secondary battery according to claim 5, wherein the auxiliary solvent is fluoroethylene carbonate or vinylene carbonate.

7. The lithium secondary battery according to claim 2, wherein a volume ratio of the ether to the mixed solvent in the non-aqueous electrolyte is not less than 60%.

8. The lithium secondary battery according to claim 1, wherein R1 and R2 are each independently an alkyl group with a carbon number of 1 or 2; and R3 is an alkylene group with a carbon number of 2.

9. The lithium secondary battery according to claim 8, wherein the non-aqueous electrolyte contains a mixed solvent of the ether and an auxiliary solvent, and the ether is represented by a chemical formula CH3O(CH2)2OCH3.

10. The lithium secondary battery according to claim 1, wherein the first lithium salt contains a boron atom.

11. The lithium secondary battery according to claim 10, wherein the first lithium salt contains at least one selected from the group consisting of a bis(oxalate)borate anion and a difluoro(oxalate)borate anion.

12. The lithium secondary battery according to claim 1, wherein the cathode comprises a cathode active material having a crystal structure which belongs to a space group R-3m.

13. The lithium secondary battery according to claim 1, wherein the sum of concentration of the first lithium salt and the second lithium salt which are contained in the non-aqueous electrolyte is not less than 3.0 mol/L and not more than 4.0 mol/L.

14. The lithium secondary battery according to claim 1, wherein the entire solvent in the non-aqueous electrolyte is a single solvent consisting of the ether or a mixed solvent of the ether and an ester.

15. The lithium secondary battery according to claim 1, wherein the anode includes an anode current collector and a first lithium metal, and the lithium metal precipitated on the surface of the anode is a second lithium metal.

16. The lithium secondary battery according to claim 1, wherein R3 is an alkylene group with a carbon number of 3 to 4.

17. The lithium secondary battery according to claim 1, wherein the cathode includes a cathode active material, the cathode active material contains Ni, Co, and Mn, and a ratio of a number of atoms of Ni to a total number of Ni, Co, and Mn is not less than 0.5.

* * * * *